United States Patent [19]

Nakamoto et al.

[11] Patent Number: 5,721,285
[45] Date of Patent: Feb. 24, 1998

[54] THERMAL INSULATING FOAMED MATERIAL AND METHOD OF MANUFACTURING THE SAME

[75] Inventors: Hideo Nakamoto, Osaka; Tomohisa Tenra, Yao; Tsukasa Takushima, Higashiosaka; Takayoshi Ueno, Katano; Masaaki Suzuki, Osaka; Fumihiro Inagaki, Osaka; Takashi Hashida, Osaka; Yoshio Kishimoto, Hirakata, all of Japan

[73] Assignees: Matsushita Electric Industrial Co., Ltd.; Matsushita Refrigeration Company, both of Osaka-fu, Japan

[21] Appl. No.: 592,068

[22] Filed: Jan. 26, 1996

[30] Foreign Application Priority Data

Jan. 30, 1995 [JP] Japan ................................. 7-012603
Jan. 30, 1995 [JP] Japan ................................. 7-012604

[51] Int. Cl.$^6$ ................................................. C08J 9/08
[52] U.S. Cl. ...................... 521/131; 521/97; 521/98; 521/126; 521/130; 521/133; 521/137; 521/155; 521/157; 521/170; 521/186
[58] Field of Search ........................ 521/97, 98, 126, 521/130, 131, 133, 137, 155, 157, 170, 186

[56] References Cited

U.S. PATENT DOCUMENTS 5,346,928  9/1994  De Vos et al. .................... 521/131

FOREIGN PATENT DOCUMENTS 0 679 681 A1  11/1995  European Pat. Off. .
57-49628       3/1982   Japan .
7-53757        2/1995   Japan .
7-173314       7/1995   Japan .

*Primary Examiner*—John M. Cooney, Jr.
*Attorney, Agent, or Firm*—Panitch Schwarze Jacobs & Nadel, P.C.

[57] ABSTRACT

The present invention provides a thermal insulating foamed material with excellent thermal insulating properties and a method of manufacturing the same. The method comprises the steps of: concurrently mixing and blowing a polyurethane material to produce a foamed polyurethane resin composition with a multiplicity of closed cells, the polyurethane material including a reactive blowing agent, a volatile compound having a boiling point of not higher than 150° C. and a molecular weight of not less than 70, an epoxy compound, and a carbon dioxide fixation catalyst, wherein the closed cells are filled with the volatile compound and carbon dioxide produced by a reaction of the reactive blowing agent with a polyisocyanate; and allowing the carbon dioxide to chemically react with epoxy groups of the epoxy compound in the presence of the carbon dioxide fixation catalyst to form a solid or liquid cyclic carbonate. The method gives a foamed material with the closed cells substantially filled with vapor of the volatile compound at a partial pressure of at least 5 mmHg at 25° C.

30 Claims, 1 Drawing Sheet

THERMAL INSULATING FOAMED MATERIAL AND METHOD OF MANUFACTURING THE SAME

BACKGROUND OF THE INVENTION

1. Field of the Invention

The present invention relates to a thermal insulating foamed material which can be applied to a refrigerator, freezer and the like, and a method for manufacturing the same.

2. Description of the Prior Art

Recently, environmental pollution or disruption such as depletion of ozone layer or global warming by chlorofluorocarbons (CFC substances) has been a social problem, and thus a reduction in or a complete abolishment of the use of particular CFC substances (such as trichloromonofluoromethane or the like), which is an important blowing agent used in manufacturing thermal insulating foamed materials such as hard polyurethane foam.

In order to cope with this problem, the use of a material almost free from depletion of ozone layer, for instance, 1,1-dichloro-1-fluoroethane (HCFC-141b), 1, 1-dichloro-2, 2,2-trifluoroethane (HCFC-123) or the like, has been proposed as the blowing agent for manufacturing the polyurethane foam.

Further, another manufacturing process of the polyurethane foam which uses as the blowing agent a hydrocarbon, such as cyclopentane or the like which has only a small influence on the environmental pollution such as depletion of ozone layer, global warming, or the like is also well known. (For instance, Gerhard Heilig and Yoshinori Kihara: "Hard Urethane Foam Blown with Pentane", Proceedings of the Polyurethane International Forum in May, 1993, p.197). The proposed pentane has however a high boiling point and is relatively difficult to use for blowing.

As a material that can solve the inflammability in addition to the global environmental concern or problem, another thermal insulating foamed material produced in a manufacturing process using only water as a blowing agent has been under development, but this also remains insufficient for obtaining an excellent thermal insulating property because of the high thermal conductivity of carbon dioxide produced in the manufacturing process and confined in the closed cells.

If a mixture of hydrocarbon such as pentane and water is used in the blowing process, it will be possible to improve the blowing ability of the hydrocarbon. There is however a disadvantage that it cannot obtain a high thermal insulating property because carbon dioxide comparable to the amount of the hydrocarbon remains in the closed cells.

One proposed method uses water as a blowing agent and fixes the evolved carbon dioxide by an epoxy compound in order to evacuate the closed cells in thermal insulating foamed material and realize vacuum thermal insulation (see Japanese Laid-Open Patent Nos. Hei 7-53757 and Hei 7-173314). This method, however, has a drawback that an additional process for preparing an aluminum thin film or the like to completely prevent invasion of the outside air is required to maintain the vacuum thermal insulation.

Another method proposed to improve the thermal insulating properties of thermal insulating foamed material minimizes the diameter of closed cells to reduce the transmission rate of radiation heat. Still another method decreases the ratio of carbon dioxide content in the closed cells.

For example, there is an attempt to improve the thermal insulating properties of polyurethane foam by minimizing the size of closed cells through addition of fluorocarbons when a hydrochlorofluorocarbon is used as a blowing agent (Japanese Laid-Open Patent No. Hei 5-186629).

Another method previously adds a carbon dioxide adsorbent, such as zeolite, to a raw material and makes the adsorbent adsorb carbon dioxide existing in the closed cells after the formation of thermal insulating foamed material.

The carbon dioxide adsorbent like zeolite, however, adsorbs water preferentially over carbon dioxide. The carbon dioxide adsorbent adsorbs part of the water content added to raw materials to react with a polyisocyanate and produce carbon dioxide and thereby depresses evolution of carbon dioxide. This results in decreasing the amount of evolved carbon dioxide contributing to the formation of cells in the thermal insulating foamed material, thus worsening the foaming efficiency of the thermal insulating foamed material. Water adsorbed on the carbon dioxide adsorbent lowers its capacity of adsorbing carbon dioxide, thereby increasing the ratio of carbon dioxide remaining in the cells.

In the process of manufacturing thermal insulating cabinets, the decrease in evolved carbon dioxide undesirably necessitates increased filling of thermal insulating foamed material or causes defective non-filled products, resulting in a remarkable lowering of the productivity and worsening of the reliability on the thermal insulating properties.

The simple manufacturing process using as a blowing agent a hydrocarbon or water, which has less effects on the issues of global environment including destruction of the ozone layer and the global warming, can not give the thermal insulating foamed material with high thermal insulating properties.

SUMMARY OF THE INVENTION

One object of the present invention is to provide a thermal insulating foamed material with excellent thermal insulating properties while considering reduction of loads affecting the global environment.

Another object of the present invention is to provide a method of manufacturing a thermal insulating foamed material with excellent thermal insulating properties by a simple process.

The present invention provides a thermal insulating foamed material comprising a foamed polyurethane resin composition with a multiplicity of closed cells, which is filled with a vapor of at least one volatile compound having a boiling point of not higher than 150° C. and a molecular weight of not less than 70 at partial pressure of at least 5 mmHg at 25° C. as well as carbon dioxide at a partial pressure lower than the partial pressure of the volatile compound. A solid or liquid cyclic carbonate compound is included in at least one wall of the closed cells of the resin composition as an addition reaction product of carbon dioxide to epoxy groups in the presence of a carbon dioxide fixation catalyst.

The present invention is also directed to a method of manufacturing a thermal insulating foamed material comprising the steps of:

(a) concurrently mixing and blowing a polyurethane raw material to produce a foamed polyurethane resin composition with a multiplicity of closed cells, the polyurethane raw material comprising a polyisocyanate, a polyol, a foam stabilizer, a catalyst for urethane reaction, a reactive blowing agent, a volatile compound having a boiling point of not higher than 150° C. and a molecular weight of not less than 70, an epoxy compound, and a carbon dioxide fixation catalyst, wherein the closed cells are filled with the volatile compound and carbon dioxide produced by the reaction of the reactive blowing agent with the polyisocyanate; and (b) allowing the carbon dioxide to chemically react with epoxy groups of the epoxy compound in the presence of the carbon dioxide fixation catalyst to form a solid or liquid cyclic carbonate compound, thereby to obtain a foamed material, wherein inside spaces of the closed cells substantially filled with a vapor of the volatile compound at a partial pressure of at least 5 mmHg at 25° C.

It is preferable that the volatile compound has a boiling point of not lower than 40° C. and not higher than 100° C., and the partial pressure of the volatile compound occupying the closed cells is not lower than 50 mmHg and not higher than 450 mmHg at 25° C.

The epoxy compound is preferably a liquid at temperatures of not lower than 10° C. and not higher than 30° C.

In accordance with one preferable mode of the present invention, the foamed polyurethane resin composition includes an epoxy compound, and carbon dioxide occupying the closed cells reacts with epoxy groups of the epoxy compound in the presence of the carbon dioxide fixation catalyst to form a solid or liquid cyclic carbonate compound. This results in a decrease in the epoxy group and an increase in the cyclic carbonate compound.

According to one preferable mode of the present invention, the polyisocyanate has 0.7 to 1.1 molar equivalents of NCO groups to the moles of hydroxyl groups in the polyurethane raw material.

According to another preferable mode of the present invention, the epoxy compound has one or greater molar equivalents of epoxy groups to the moles of carbon dioxide produced by the reaction of the reactive blowing agent with the polyisocyanate.

It is preferable that the epoxy compound has two to four epoxy groups in one molecule thereof.

It is also preferable that the epoxy compound has one to three hydroxyl groups in one molecule thereof.

In accordance with one preferable mode, the reactive blowing agent is water and its content in the polyurethane raw material is not less than 0.5 parts by weight but less than 1.5 parts by weight per 100 parts by weight of the polyol.

In accordance with another preferable mode, the epoxy compound has 2.5 to 4 molar equivalents of epoxy groups to the moles of carbon dioxide produced by the reaction of the reactive blowing agent with the polyisocyanate.

In one preferable mode, a combination of organotin compound with an onium compound functions as the catalyst for urethane reaction and the carbon dioxide fixation catalyst.

In another preferable mode, the step (a) is carried out in a container, and the polyurethane raw material is injected into the container in an atmosphere of at least one gas selected from the group consisting of xenon, krypton, and carbon dioxide.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Figure 1:
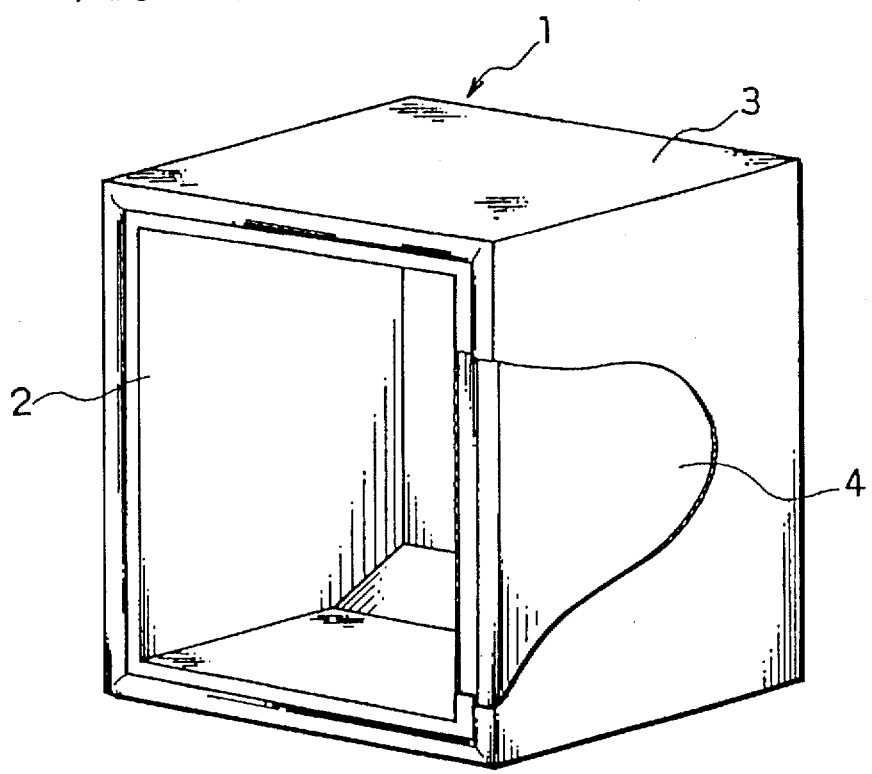
FIG. 1 is a partly omitted, perspective view showing an example of a thermal insulating cabinet filled with a polyurethane foam in accordance with the present invention.

Description is given first for the volatile compound and the reactive blowing agent used in the present invention.

The volatile compound represents any conventional blowing agent, which is vaporized by application of heat and may have a higher boiling point than usual. While its stable phase at ordinary temperature may be a solid, liquid or gas, the volatile compound has a vapor pressure in an equilibrium state at room temperature and partly exists as a gas. A mixture of two or more volatile compounds may be used.

The reactive blowing agent chemically reacts with a specific substance to produce carbon dioxide, which is fixed as a solid or liquid cyclic carbonate compound through its chemical reaction with an epoxy compound. The reactive blowing agent used in the present invention may be water or a lower carboxylic acid, such as formic acid or acetic acid, which reacts with a polyisocyanate to produce carbon dioxide.

The features, aspects, and advantages of the present invention will become more apparent through the following detailed description.

The thermal insulating foamed material of the present invention comprises a foamed polyurethane resin composition with a multiplicity of closed cells having the characteristics described below.

In the thermal insulating foamed material, a solid or liquid cyclic carbonate is included at least in the vicinity of an inner surface of the closed cells as an addition reaction product of carbon oxide to epoxy groups of an epoxy compound in the presence of a carbon dioxide fixation catalyst. A partial pressure of the volatile compound occupying the closed cells is least 5 mmHg at 25° C. The volatile compound has a boiling point of not higher than 150° C., a vapor pressure of approximately 5 mmHg or greater at 25° C., and a molecular weight of not less than 70 to be equivalent to or greater than the molecular weight of cyclopentane, which is conventionally used, in order to possess a thermal conductivity equivalent to or lower than that of cyclopentane.

The reaction formula given below shows an addition reaction of carbon dioxide to epoxy groups of an epoxy compound to form a solid or liquid cyclic carbonate compound.

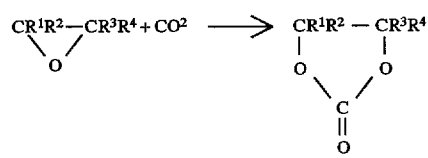

wherein $R^1$, $R^2$, $R^3$, and $R^4$ represent hydrogen atoms or substituent groups. The epoxy compound shown as a three-membered ring ether in the above formula may have a four- or greater-membered ring.

This is a two-molecule reaction; that is, a less number of molecules are involved in the reaction. Carbon dioxide in a gas form freely moves to the epoxy groups and thus allows the reaction to favorably proceed even in the solid form like resin.

As described previously, the partial pressure of carbon dioxide occupying the closed cells is lower than that of the volatile compound. This results in a low thermal conductivity and favorable thermal insulating properties. The partial pressure of the volatile compound occupying the closed cells is at least 5 mmHg, which effectively interferes with the deterioration of thermal insulating properties due to the invaded air, compared with vacuum thermal insulators.

It is preferable that the following relationship is satisfied:

{[partial pressure of carbon dioxide]/[partial pressure of volatile compound]}<0.1.

This is ascribed to the following reason.

In the presence of carbon dioxide, the thermal conductivity increases in proportion to the simple approximation of

[partial pressure of carbon dioxide]/{[partial pressure of carbon dioxide]+[partial pressure of volatile compound]}.

In thermal insulating foamed material prepared with substantially no water but a conventional chlorofluorocarbon as a blowing agent, {[partial pressure of carbon dioxide]/[partial pressure of volatile compound]}>0.1.

When the relationship of

{[partial pressure of carbon dioxide]/[partial pressure of volatile compound]}<0.1 is satisfied, contribution of carbon dioxide to an increase in thermal conductivity is significantly lowered.

As described below, the method of the present invention decreases the content of isocyanate and increases the content of epoxy compound, thereby easily producing a thermal insulating foamed material satisfying the relationship of {[partial pressure of carbon dioxide]/[partial pressure of volatile compound]}<0.1.

The thermal insulating foamed material of the present invention is completed when the fixation of carbon dioxide proceeds to make the partial pressure of carbon dioxide lower than the partial pressure of the volatile compound. An epoxy group-containing compound and a cyclic carbonate produced by the reaction of the epoxy group with carbon dioxide are accordingly present in the thermal insulating foamed material of the present invention. With the elapse of time, the reaction further proceeds to decrease the concentrations of carbon dioxide and epoxy groups while increasing the cyclic carbonate. This further improves the thermal insulating properties of the thermal insulating foamed material.

The method of manufacturing the thermal insulating foamed material according to the present invention comprises the steps of:

mixing and blowing a polyurethane raw material comprising a volatile compound and a reactive blowing agent to yield a foamed polyurethane resin composition with a multiplicity of closed cells filled with the volatile compound and carbon dioxide produced by the reaction of the reactive blowing agent with a polyisocyanate; and allowing the carbon dioxide occupying the closed cells to react with an epoxy compound in the resin composition to fix the carbon dioxide.

This method gives a thermal insulating foamed material in several to several tens minutes, which is a time period generally required for formation of a conventional foamed polyurethane resin composition. After the blowing process, the manufacture is completed when the partial pressure of carbon dioxide occupying the closed cells becomes equal to or lower than the partial pressure of the volatile compound. This does not imply the conclusion of fixation of carbon dioxide. The fixation of carbon dioxide may proceed even after the manufacture of the foamed material to decrease the content of carbon dioxide. Carbon dioxide in a gas form chemically reacts with an epoxy compound in the resin. This reaction proceeds preferentially in the vicinity of the inner surface of the closed cells with the high concentration of carbon dioxide, so that a cyclic carbonate compound is formed in the vicinity of the inner surface of the closed cells.

The volatile compound used in the present invention has a boiling point of not higher than 150° C. and a molecular weight of not less than 70. The volatile compound occupying the closed cells of the thermal insulating foamed material thus obtained has a partial pressure of at least 5 mmHg since the boiling point is not higher than 150° C.

Unlike the vacuum thermal insulators, in the thermal insulating foamed material of the present invention, the partial pressure of carbon dioxide occupying the closed cells is not required to be 1 mmHg or lower. In order to attain vacuum thermal insulation with water used as a blowing agent, the partial pressure of carbon dioxide occupying the closed cells should be not greater than 1 mmHg for a decrease in thermal conductivity. In the thermal insulating foamed material of the present invention, on the other hand, the thermal conductivity decreases with a decrease in ratio of the partial pressure of carbon dioxide to that of the volatile compound, without fixing carbon dioxide to the partial pressure of 1 mmHg or lower. The thermal insulating foamed material of the present invention efficiently reduces the thermal conductivity with a less amount of epoxy compound.

The primary objects of the present invention are to provide a favorable foamed material using a combination of a reactive blowing agent, such as water, with a volatile compound having a poor blowing efficiency and to fix carbon dioxide evolved from the reactive blowing agent in order to depress an increase in thermal conductivity. A significant improvement in blowing efficiency implies a requirement for fixation of a large amount of evolved carbon dioxide. It is thus essential to find optimum ranges for the boiling point of the volatile compound and the amount of the reactive blowing agent, which meet both the requirements for the improved blowing efficiency and fixation of carbon dioxide.

Volatile compounds with a boiling point of lower than 40° C. originally have a favorable blowing efficiency without a reactive blowing agent; the present invention does not have much effect on such volatile compounds. Volatile compounds with a high boiling point have a small vapor pressure, and the thermal conductivity thereof is easily affected by the partial pressure of remaining carbon dioxide. It is accordingly preferable to use a volatile compound having a boiling point of not higher than 100° C. and a vapor pressure of at least 50 mmHg at 25° C. Volatile compounds with a boiling point of higher than 60° C. require a greater amount of water used as the reactive blowing agent for the improvement in blowing efficiency as well as a greater amount of an epoxy compound. It is thus preferable to use a volatile compound having a boiling point of 40° to 60° C. and a relatively high blowing efficiency in combination with a relatively small amount of water as the reactive blowing agent, that is, not less than 0.5 parts by weight but less than 1.5 parts by weight per 100 parts by weight of a polyol. This reduces the required amount of carbon dioxide fixation catalyst and epoxy compound and saves the manufacturing cost.

When 1.5 g of water per 100 g of a polyol is used as the reactive blowing agent, the amount of carbon dioxide evolved by the reaction of water with a polyisocyanate is 1.5/18 mole. The total weight of the polyurethane raw material including a polyol, a polyisocyanate, a volatile compound, an epoxy compound, and a carbon dioxide fixation catalyst is generally 250 to 300 g per 100 g of the polyol. The amount of carbon dioxide produced by the reaction of water with the polyisocyanate is accordingly not greater than $(1.5/18)/(250/100)=0.33$ mole per 100 g of the thermal insulating foamed material. In an actual procedure, isocyanate molecules react with each other to produce a carbodiimide and release carbon dioxide. The actual amount of carbon dioxide is thus a little greater than the above value, though the increase is only 0.040 mole at most. Even when all the increased amount of carbon dioxide is added to epoxy groups to form a carbonate, the carbonate formed is 0.040 mole at most per 100 g of the thermal insulating foamed material. The carbonate, which is not used as a resin component, simply increases the density and weight of the thermal insulating foamed material. It is thus preferable to minimize the formation of the cyclic carbonate.

As described previously, water added as the reactive blowing agent does not have much effect on the volatile compounds with a boiling point of lower than 40° C. Addition of water as little as 0.5 parts by weight per 100 parts by weight of a polyol is sufficient for the manufacture. When a compound containing fluorine atoms, for example, a hydrofluorocarbon (HFC), which is more expensive than the epoxy compound, is used as the volatile compound, addition of water and fixation of evolved carbon dioxide are important for the reduction of the amount of volatile compound and thereby the manufacturing cost, in addition to the improvement in blowing efficiency. When an expensive volatile compound with a boiling point of not higher than 40° C., for example, a hydrofluorocarbon or more specifically 1,1,1,3,3-pentafluoropropane with favorable thermal conductivity, is used as the volatile compound, at least 0.5 parts by weight of water per 100 parts by weight of a polyol should be used as the reactive blowing agent. This preferably reduces the amount of the expensive volatile compound.

In the method of manufacturing the thermal insulating foamed material according to the present invention, it is preferable to use an epoxy compound having one or more molar equivalents of epoxy groups to the stoichiometric moles of carbon dioxide evolved by the reaction of the reactive blowing agent with a polyisocyanate. It is also preferable that the polyisocyanate has 0.7 to 1.1 molar equivalents of NCO groups to the moles of hydroxyl groups in the polyurethane raw material. This is ascribed to the following reason.

In the process of forming a polyurethane resin, the reaction of epoxy groups with a polyisocyanate proceeds to consume the epoxy groups, which are to react with carbon dioxide. The effective measure to be taken here is increasing the amount of epoxy groups or decreasing the amount of the polyisocyanate reacting with the epoxy groups. The above condition gives a sufficient amount of remaining epoxy groups and ensures the smooth fixation of carbon dioxide.

The epoxy compound used in the present invention is preferably a liquid at temperatures of not lower than 10° C. and not higher than 30° C., which are generally applied as the temperature of an atmosphere for producing a thermal insulating foamed material. The epoxy compound in a liquid form is easily dispersed or dissolved in another component of the polyurethane raw material like a polyol, thus saving the time required for the mixing process and accelerating the fixation of carbon dioxide.

In the thermal insulating foamed material of the present invention, it is preferable that the molar concentrations of the epoxy group of the epoxy compound, carbon dioxide evolved by the reaction of the reactive blowing agent, and the isocyanate group of the polyisocyanate included in the polyurethane resin composition immediately after the blowing process satisfy the following relationship:

$$\text{[Concentration of epoxy group]} > \{\text{[Concentration of carbon dioxide]} + \text{[Concentration of isocyanate group]}\} \quad (1)$$

Even when epoxy groups react with the polyisocyanate and carbon dioxide is newly produced by the reaction between isocyanate groups after the foaming process, this relationship ensures continuance of the fixation of carbon dioxide to decrease the amount of carbon dioxide.

It is further preferable that an excess of epoxy groups exists and the following relation is fulfilled, $$3\{\text{[Concentration of carbon dioxide]}+\text{[Concentration of isocyanate group]}\} > \text{[Concentration of epoxy group]} > 2\{\text{[Concentration of carbon dioxide]}+\text{[Concentration of isocyanate group]}\} \quad (2)$$

wherein fixation of carbon dioxide proceeds more efficiently and quickly. The amount of epoxy groups satisfying the above relation is preferable, since the greater amount of epoxy groups does not lower the resulting thermal conductivity nor further improve the fixation rate of carbon dioxide while increasing the manufacturing cost. The concentration of epoxy group, the concentration of carbon dioxide, and the concentration of isocyanate group represent the number of epoxy groups, the number of carbon dioxide molecules in a gas form, and the number of isocyanate groups present in a fixed amount of the thermal insulating foamed material, respectively. These concentrations are measured by liquid chromatography for the extracts from the thermal insulating foamed material into a solvent, gas chromatography for the thermal insulating foamed material, or infrared absorption analysis of a piece of the thermal insulating foamed material.

These conditions described above are realized by the method of the present invention.

The fixation rate of carbon dioxide in the manufacturing and subsequent processes increases with an increase in amount of the carbon dioxide fixation catalyst. Most carbon dioxide fixation catalysts have an activity to the urethane reaction. The large amount of the carbon dioxide fixation catalyst accordingly makes it difficult to control the urethane reaction. It is thus essential to determine the minimum but sufficient amount of epoxy groups and then regulate the amount of the carbon dioxide fixation catalyst to attain the desired fixation rate of carbon dioxide.

In the method of manufacturing the thermal insulating foamed material according to the invention, it is preferable to use the epoxy compound containing epoxy groups of not less than 2.5 molar equivalents and not more than 4 molar equivalents to the stoichiometric moles of carbon dioxide produced from water used as the reactive blowing agent, as the amount to attain the desired fixation rate of carbon dioxide. Using the epoxy groups of not less than 2.5 molar equivalents fixes the greater portion of carbon dioxide. An increase in amount of epoxy groups enhances the fixation rate of carbon dioxide. The epoxy groups of more than 4 molar equivalents, however, do not substantially improve the thermal conductivity of the resultant foamed material.

The epoxy groups in the above range allow the relation (1) and the left part of the relation (2) given above to be satisfied even in a known method using an amine as the catalyst for urethane reaction and a zinc halide and an onium compound as the carbon dioxide fixation catalyst. The relation (2) is satisfied by using 3.5 to 4 molar equivalents of epoxy groups to the stoichiometric moles of carbon dioxide produced by the reaction of a polyisocyanate with water used as the reactive blowing agent.

An organotin catalyst, such as dibutyltin laurate, which does not accelerate the reaction of epoxy groups with isocyanate, is preferably used as the catalyst for urethane reaction used in the method of the present invention. Compared with the conventional method using an amine as the catalyst for urethane reaction, the organotin catalyst increases the remaining amount of epoxy groups and thereby decreases the required amount of epoxy compound. For a fixed amount of epoxy compound, the time required for the fixation of carbon dioxide is shortened.

It is desirable for the urethane reaction to add an amine catalyst to the slow-foaming organotin catalyst for improving the foaming rate or to add formic acid having the higher foaming rate than water as the reactive blowing agent.

In the process of producing the thermal insulating foamed material, part of the excess epoxy compound is incorporated into the resin component constituting the cell membranes and the skeleton by the reaction with the polyisocyanate or by the epoxy ring-opening reaction influenced by the action of the catalyst for urethane reaction. Most of the liquid epoxy compound is solidified through the fixation of carbon dioxide, and is substantially free from troubles like shrinkage.

Especially the epoxy compound having two to four epoxy groups in one molecule thereof forms the crosslinking structure as part of the resin component constituting the cell membranes and the skeleton by the reaction with the polyisocyanate or by the epoxy ring-opening reaction influenced by the action of the catalyst for urethane reaction. This realizes the hybrid structure of urethane resin and epoxy resin with the improved mechanical strength.

In the process of producing the thermal insulating foamed material, the epoxy compound having one to three hydroxyl groups in one molecule thereof forms the crosslinking structure as part of the resin component constituting the cell membranes and the skeleton through the reaction of the hydroxyl groups with the polyisocyanate. This realizes the hybrid structure of urethane resin and epoxy resin with the improved mechanical strength.

In the method of the present invention, the reactive blowing agent added to the polyurethane raw material chemically reacts with a polyisocyanate to produce carbon dioxide and contribute to formation of closed cells in the thermal insulating foamed material. Carbon dioxide included in the closed cells of the resultant thermal insulating foamed material is fixed by the epoxy compound. This improves the packing properties of polyurethane foam into the thermal insulating cabinet and enhances the thermal insulating properties and the mechanical strength of the resultant thermal insulating foamed material.

Typical examples of the epoxy compound having two to four epoxy groups in one molecule thereof include trimethylolpropane polyglycidyl ether, neopentylglycol diglycidyl ether, and bisphenol A epoxy resin.

Typical examples of the epoxy compound having one to three hydroxyl groups in one molecule thereof include glycidol, glycerol polyglycidyl ether, and sorbitol polyglycidyl ether.

As the volatile compound, which eventually serves as a cell filling gas, any compound having a boiling point of 150° C. or lower and a molecular weight of 70 or larger may be used in constituting the thermal insulating foamed material in accordance with the present invention, though the following compounds are preferably employed in general.

First, a cyclohydrocarbon is preferable for improving the thermal insulating property. The cyclohydrocarbon may be exemplified as cyclopentane (molecular weight: 70.14), cyclohexane (molecular weight: 84.16), cyclohexene (molecular weight: 82.15), 1,4-cyclohexadiene (molecular weight: 80.13), 1,3-cyclohexadiene (molecular weight: 80.13), and quadricyclane (molecular weight: 92.14). Preferably employed aromatic compound may be exemplified as benzene (molecular weight: 78.11), toluene (molecular weight: 92.14), thiophene (molecular weight: 84.1), fluorobenzene (molecular weight: 96.1), chlorobenzene (molecular weight: 113.56), and the like. In order to be minimize the influence of any impurity such as air, a compound having from five to six carbon atoms and a saturation vapor pressure of about 100 mmHg or above at room temperature is best suited for the purpose.

From the viewpoint of thermal conductivity, the suitable compound may further be exemplified as pyrimidine (molecular weight: 80.09), pyrazine (molecular weight: 80.09), pyridine (molecular weight: 79.10), tetrahydrofuran (molecular weight: 72.1), tetrahydropyran (molecular weight: 86.13), 1,3-dioxolan (molecular weight: 74.1), dioxane (molecular weight: 88.1), 1,4-dioxene (molecular weight: 86.1), trioxane (molecular weight: 90.07), thiazole (molecular weight: 85.12), 2-methoxy-1,3-dioxolan (molecular weight: 104.11), and the like.

From the viewpoint of reducing the thermal conductivity, it is particularly preferable to employ a configuration wherein a fluorohydrocarbon selected from highly fluorinated or perfluorinated compounds of large molecular weight having from three to seven carbon atoms, fluoroethers having three to eight carbon atoms, and fluorotertiaryamines having from three to six carbon atoms constitutes the gas filled in the closed cells.

As the fluorohydrocarbon selected from the highly fluorinated or perfluorinated compounds having from three to eleven carbon atoms, there are those in a straight chain state, branched chain state and cyclic chain state. Concrete examples are presented below: 1,1,1,4,4,4-hexafluorobutane (molecular weight: 166, boiling point: 24.6° C.), 1,1,1,3,3-pentafluoropropane (molecular weight: 134, boiling point: 14° C.), 1,1,2,2,3-pentafluoropropane (molecular weight: 134, boiling point: 26° C.), perfluorohexane (molecular weight: 338, boiling point: 60° C.), perfluorocyclohexane (molecular weight: 300), perfluoroheptane (molecular weight: 370, boiling point: 80° C.), perfluoro (methylcyclohexane) (molecular weight: 350, boiling point: 76° C.), perfluoro(methylcyclopentane) (molecular weight: 300, boiling point: 60° C.), perfluoropentane (molecular weight: 288, boiling point: 29.5° C.), perfluorocyclopentane (molecular weight: 250), perfluoroisopentane (molecular weight: 288), perfluoro-3-methylbutane (molecular weight: 288), perfluoro-2,2-dimethylpropane (molecular weight: 288), perfluoro-isohexane (molecular weight: 338), perfluoro-3-methylpentane (molecular weight: 338), perfluoro-2,2-dimethylbutane (molecular weight: 338), perfluoro-2,3-dimethylbutane (molecular weight: 338), perfluorodimethylcyclobutane (molecular weight: 300), and the like. Further, as a highly fluorinated hydrocarbon which is considered to have a short life in air and thus have only a small influence on the global concern on the global warming, there are highly fluorinated alkenes, and may be exemplified as perfluoro-2-methyl-2-pentene, perfluoro-4-methyl-2-pentene, perfluoro-2-pentene, (perfluorobutyl) ethylene, (perfluoroisopropyl)ethylene, hexafluoropropene, hexafluoro-1,3-butadiene, octafluoro-2-butene, octafluorocyclopentene, 3,3,4,4,4-pentafluorobutene-1, perfluoroheptene-1, perfluorooctene-1, 1H,1H,2H-perfluoro-1-octene, tetrafluoroethylene, and the like.

Moreover, as the highly fluorinated or perfluorinated fluoroethers having from three to eight carbons, there are those in a straight chain state, branched chain state and cyclic chain state. Concrete examples are shown below: 2,2,3,3,3-pentafluoropropylmethylether (molecular weight: 164, boiling point: 46° C.), 2,2,3,3,3-pentafluoropropyl-1,1,2,2-tetrafluoroethylether (molecular weight: 250, boiling point: 58° C.), 1,1,2,2-tetrafluoroethylmethylether (molecular weight: 132, boiling point: 38° C.), 1,1,3,3,3-pentafluoro-2-trifluomethylpropylmethylether (molecular weight: 232, boiling point: 68°–74° C.), perfluorodiethylether (molecular weight: 254), perfluoro-2-butyltetrahydrofuran (molecular weight: 416, boiling point: 99°–107° C.), 1,1,2,3,3,3-hexafluoropropylmethylether (molecular weight: 180.06, boiling point: 53° C.), 2,2,2-trifluoroethyldifluoromethylether (molecular weight: 150.04, boiling point: 29° C.), and the like.

Moreover, as the highly fluorinated or perfluorinated fluorotertiaryamines having from three to six carbon atoms, any of those in a straight chain state, branched chain state and cyclic chain state can be applied. For instance, perfluorotriethylamine (molecular weight: 371), perfluoropyridine (molecular weight: 169, boiling point: 89° C.), and the like are preferably employed.

Moreover, in the above-mentioned manufacturing method, it is possible to adjust the diameter of the closed cells by controlling the pressure inside the container, wherein the molding and blowing are performed, by means of a vacuum pump. In case of the concurrent molding and blowing under an atmospheric or normal pressure, the timing between the formation of polyurethane and the blowing is determined in compliance with the boiling point of the blowing agent. If the boiling point of the blowing agent is low and the blowing is too rapid, the size of the closed cells becomes undesirably large because of the too much softness of the resin. In contrast, if the boiling point is excessively high, a sufficient volumetric increase of the resin cannot be obtained because the heat required for the blowing cannot sufficiently be obtained by the polyurethane formation reaction, or, even if some heat can be obtained, the blowing is undesirably retarded. Therefore, in case of the concurrent molding and blowing under an atmospheric pressure, only such blowing agents that have a boiling point of from room temperature to about 50° C. can be used.

In contrast to this, the manufacturing method in accordance with the present invention can adjust the timing of the blowing process by controlling the degree of pressure-reduction inside the container wherein blowing and molding process is performed. Thus, it is possible to adequately determine the timing of the polyurethane formation reaction and the blowing process and to realize a desirable size of the closed cells, thereby to facilitate the manufacturing of the thermal insulating foamed material having an excellent thermal insulating property. Further, the use of the volatile compounds having a high boiling point and a low thermal conductivity is possible, thereby to make it easy to manufacture the excellent thermal insulating foamed material. The preferable timing of the blowing process is experimentally determined, that is, by varying the time point of initiating the pressure-reduction by means of a vacuum pump and the speed in the pressure-reduction to compare them with the diameter of the obtained closed cells. And, if the diameter of the closed cells is too small, the time point of initiating the pressure-reduction is hastened and the speed is increased. If too large, the time point of initiating the pressure-reduction is delayed and the speed is decreased.

Further, since only a small amount of the reactive blowing agent is sufficient in this blowing process under a reduced pressure, as compared with that under an atmospheric or normal pressure and the time period required for fixing carbon dioxide produced by reaction of the reactive blowing agent can be made short. Therefore, the safety at the manufacturing process can be improved even when the reactive blowing agent is inflammable because only a small amount of the reactive blowing agent is required.

Moreover, from the viewpoint of obtaining a foamed material having a high thermal insulating property, it is desirable to previously remove any impurity such as air. In particular, when the vapor pressure of the volatile compound confined in the closed cells is low, the influence of the above-mentioned impurity is large, and thus the following process of removing the impurity becomes more important. Removal of the impurity such as air may be possible by reducing the pressure by means of a vacuum pump or the like. However, in order to remove the impurity more completely, it is recommendable to bubble the inside of the container and to substitute atmosphere surrounding the polyurethane raw material with a particular gas, or to repeat the bubbling and the pressure-reduction by means of a vacuum pump.

As the particular gas, it is preferable to employ a gas having a nonflammability in view of the safety and low thermal conductivity so as not to increase the thermal conductivity inside the closed cells even if it remains in a minute amount in the closed cells. As such gases, although krypton, xenon, and the like are suitable, it is also possible to use a highly fluorinated hydrocarbon having a boiling point of from –30° C. to 20° C. The highly fluorinated hydrocarbon is a hydrocarbon most of whose hydrogen atoms are substituted by fluorine atoms and which is easy to recover by cooling or compressing because of low boiling point.

It is preferable that the polyurethane raw material is injected into the container under a pressure of the above gas, especially, xenon, krypton, or carbon dioxide.

The carbon dioxide which has first acted as a blowing agent is then reacted with the epoxy compound by an action of the carbon dioxide fixation catalyst employed in the present invention, and turns into a cyclic carbonate to be fixed. As the epoxy compound, various glycidyl ethers, triethylene oxides, and the like, are employed. In particular, there are exemplified as glycidol, phenylglycidyl ether, butylglycidyl ether, 2-ethylhexylglycidyl ether, 2-methyloctylglycidyl ether, glycerol diglycidyl ether, glycerol triglycidyl ether, trimethylolpropane polyglycidyl ether, neopentylglycol diglycidyl ether, ethylene glycol diglycidyl ether, and the like.

As the carbon dioxide fixation catalyst, a combination of a metal halide such as zinc chloride, zinc bromide, zinc iodide or the like with an onium salt such as ammonium salt, phosphonium salt, sulfonium salt, oxonium salt, arsonium salt, stibonium salt, selenonium salt, iodonium salt, stannonium salt or the like is employed. In addition to these, an alkali metal halide such as lithium chloride, lithium bromide, sodium iodide, lithium iodide or the like, and the above-mentioned onium salt, either alone or in combination, are also available for the production of the cyclic carbonate. Further, the above-mentioned catalyst may be included in either of the polyol composition or the isocyanate.

Some examples in accordance with the present invention are described below. In the following description, the term 'parts' represent parts by weight unless otherwise specified.

FIG. 1 shows a thermal insulating cabinet 1 obtained in the following examples. The thermal insulating cabinet 1 includes an inner housing 2 made of an ABS resin, an outer housing 3 made of iron, and a polyurethane foam 4 filled in a space defined by the inner housing 2 and the outer housing 3.

[EXAMPLE 1]

A polyol composition was prepared by mixing a mixture of 100 parts of an aromatic amine polyether polyol having a hydroxyl group value of 460 mgKOH/g, 2.0 parts of a catalyst for urethane reaction (KAOLIZER No. 1, available from Kao Corporation, Japan), 1.5 parts of a foam stabilizer (a silicone surfactant F-335, available from Shin-Etsu Chemical Co., Ltd., Japan), 1.0 part of water functioning as a reactive blowing agent, and specific parts of cyclopentane functioning as a volatile compound adjusted to give a free blow density of 25 to 27 kg/m$^3$ to a resultant thermal insulating foamed material, with a mixture of 15 parts of phenyl glycidyl ether as an epoxy compound and 1 part of tetrabutylammonium bromide/zinc chloride (1/1) as a carbon dioxide fixation catalyst. An isocyanate component was a polyisocyanate composed of diphenylmethane diisocyanate (hereinafter referred to as crude MDI) having an amine equivalent of 135.

The 15 parts of phenyl glycidyl ether correspond to 1.8 molar equivalents of epoxy groups to the moles of carbon dioxide produced by the reaction of 1.0 part of water working as the reactive blowing agent with the polyisocyanate.

The polyol composition and the isocyanate component thus prepared were mixed with each other with a high pressure foaming machine at a ratio of 0.9 molar equivalents of NCO groups to the moles of hydroxyl groups in the polyol composition. The polyurethane raw material thus prepared was injected into a space configured between an inner housing and an outer housing and allowed to blow itself to obtain a polyurethane foam. This gave a thermal insulating cabinet filled with the polyurethane foam.

[Reference A]

A thermal insulating cabinet was prepared in the same manner as in Example 1, except that the polyol composition and the isocyanate component were mixed with each other at a ratio of 0.65 molar equivalents of NCO groups to the moles of hydroxyl groups in the polyol composition.

[Reference B]

A thermal insulating cabinet was prepared in the same manner as in Example 1, except that the polyol composition and the isocyanate component were mixed with each other at a ratio of 1.2 molar equivalents of NCO groups to the moles of hydroxyl groups in the polyol composition.

[Reference C]

A thermal insulating cabinet was prepared in the same manner as Example 1, except that 15 parts of the epoxy compound and 1 part of the carbon dioxide fixation catalyst were omitted from the polyol composition of Example 1 and that 25 parts of zeolite (zeolite 5A, available from Tosoh Corporation, Japan) working as a carbon dioxide adsorbent were mixed with the isocyanate component.

After each of the thermal insulating cabinets thus obtained was left at room temperature for four weeks, a portion of the thermal insulating foamed material was sampled from the cabinet and analyzed by measuring the thermal conductivity, the core density, and the compressive strength thereof. The core density was used for evaluating the packing properties of the thermal insulating foamed material. The gas composition included in the thermal insulating foamed material was analyzed to evaluate the fixation rate of carbon dioxide. The results of measurement are shown in Table 1.

TABLE 1

|  |  | Example | Reference | | |
|---|---|---|---|---|---|
|  |  | 1 | A | B | C |
| Molar equivalents of NCO groups to hydroxyl groups in polyol composition | | 0.9 | 0.65 | 1.2 | 0.9 |
| Content of volatile compound in raw material (wt %) | | 7 | 7 | 7 | 7 |
| Thermal conductivity | (W/mk) | 0.0175 | 0.0175 | 0.0180 | 0.0180 |
| Gas composition (%) | $CO_2$ | 5 | 5 | 30 | 15 |
|  | CP | 95 | 95 | 70 | 85 |
| Density (kg/cm$^3$) | Max. | 37 | 40 | 36 | 48 |
|  | Min. | 35 | 35 | 34 | 35 |
| Compressive strength ($10^5$Pa) | Max. | 1.8 | 1.2 | 1.9 | 1.4 |
|  | Min. | 1.4 | 0.8 | 1.4 | 0.7 |

CP represents cyclopentane in Table 1 and other similar tables.

As clearly shown in Table 1, the thermal insulating foamed material of Example 1 had a significantly small ratio of carbon dioxide remaining in the closed cells thereof and thereby possessed excellent thermal insulating properties.

This may be ascribed to the following reason.

The polyisocyanate has reaction activities to the hydroxyl groups and the epoxy compound in the raw material. The reaction of the polyisocyanate with the epoxy compound, phenyl glycidyl ether, proceeds more slowly than the reaction of the polyisocyanate with hydroxyl groups. Most of the NCO groups in the polyisocyanate with the index of 0.9 reacts with the hydroxyl groups, which effectively reduces consumption of epoxy groups. This leaves a required and sufficient amount of epoxy groups for fixing carbon dioxide remaining in the closed cells after the formation of the thermal insulating foamed material.

In the blowing process of the thermal insulating foamed material, phenyl glycidyl ether does not inhibit the evolution of carbon dioxide through the reaction of water used as the reactive blowing agent with the polyisocyanate. This enables the evolved carbon dioxide to work as a blowing agent and effectively fixes the carbon dioxide remaining in the closed cells of the thermal insulating foamed material.

As described previously, the phenyl glycidyl ether used in Example 1 contained 1.8 molar equivalents of excess epoxy groups to the moles of carbon dioxide produced by the reaction of water working as the reactive blowing agent with the polyisocyanate. Even when the epoxy ring-opening reaction influenced by the action of the catalyst for urethane reaction proceeds in the process of forming the thermal insulating foamed material, using the phenyl glycidyl ether leaves epoxy groups required for fixing the carbon dioxide remaining in the closed cells.

In the process of preparing the thermal insulating foamed material, part of the phenyl glycidyl ether forms the crosslinking structure as part of the resin component constituting the cell membranes and the skeleton by the reaction with the polyisocyanate, thereby improving the mechanical strength of the resultant thermal insulating foamed material.

Reference A almost completely fixed the carbon dioxide evolved in the blowing process and reduced the thermal conductivity of the resultant thermal insulating foamed material, whereas decreasing the mechanical strength of the thermal insulating foamed material and significantly worsening the appearance and quality of the thermal insulating cabinet. This may be ascribed to the smaller ratio of NCO groups of the polyisocyanate to hydroxyl groups. The inadequate composition did not allow the non-reacted hydroxyl groups to form the crosslinking and thereby lowered the mechanical strength of the resin.

Reference B did not sufficiently fix the carbon dioxide produced in the blowing process. The carbon dioxide remaining in the closed cells resulted in insufficient reduction of the thermal conductivity of the resultant thermal insulating foamed material. This may be ascribed to the reaction of the polyisocyanate with the epoxy compound in the process of forming the thermal insulating foamed material, which did not leave the sufficient epoxy groups for fixing carbon dioxide.

Reference C reduced the amount of carbon dioxide remaining in the closed cells to some extent while suffering from an extremely poor foaming efficiency. The thermal insulating foamed material prepared in Reference C had a high density with large scatter. This worsened the packing properties into the cabinet. The thermal insulating foamed material also had an extremely poor compressive strength.

[EXAMPLE 2]

A thermal insulating cabinet was prepared in the same manner as in Example 1, except that 7 parts of tetrabutylammonium bromide/zinc bromide (4/1) were used as a carbon dioxide fixation catalyst and that the polyol composition and the isocyanate component were mixed with each other at a ratio of 1.0 molar equivalent of NCO groups to the moles of hydroxyl groups in the polyol composition.

The gas included in the resultant thermal insulating foamed material was analyzed five hours after the blowing process. The measurement showed that the partial pressure of carbon dioxide was lower than the partial pressure of cyclopentane. This means that the production of the thermal insulating foamed material was concluded. The thermal insulating foamed material obtained had the thermal conductivity of 0.0185 W/mk on the next day after the production, which further decreased to 0.0180 W/mk in seven days. With the decrease in thermal conductivity, the partial pressure of carbon dioxide decreased from 110 mmHg to 75 mmHg, and the amount of epoxy groups measured by liquid chromatography for the extracts into methanol decreased by approximately 20% while the amount of carbonate increased by the corresponding ratio.

In the manufacturing process, air in a space between the inner housing and outer housing was replaced with carbon dioxide, and the polyurethane raw material was injected into the space under a pressure of carbon dioxide and foamed in an atmosphere of carbon dioxide. Under such condition, the thermal conductivity was lowered to 0.0178 W/mk in seven days after the production.

The decrease in thermal conductivity, the decrease in epoxy group, and the increase in carbonate with time may be ascribed to the continuing reaction of the epoxy group with carbon dioxide in the thermal insulating foamed material.

The improvement in thermal conductivity by foaming in an atmosphere of carbon dioxide is attributable to that injecting the raw material under a pressure of the air or nitrogen and foaming the material in an atmosphere of the air or nitrogen according to the known method may cause the resultant thermal insulating foamed material to be contaminated with a little amount of oxygen or nitrogen.

[EXAMPLE 3]

A thermal insulating cabinet was prepared in the same manner as in Example 2, except that the amount of epoxy groups was 2.6 molar equivalents to the moles of carbon dioxide produced by the reaction of water working as the reactive blowing agent with the polyisocyanate.

The gas included in the resultant thermal insulating foamed material was analyzed 12 hours after the blowing process. The measurement showed that the partial pressure of cyclopentane was more than three times the partial pressure of carbon dioxide. This means that the production of the thermal insulating foamed material was concluded.

The thermal insulating foamed material obtained had the thermal conductivity of 0.0175 W/mk on the eighth day after the production. The decrease in thermal conductivity was substantially stopped in two weeks at the level of 0.0173 W/mk.

The epoxy compound was extracted from the sample piece of the thermal insulating foamed material immediately after the blowing process into methanol. The concentration of epoxy groups was measured by liquid chromatography. In the same manner, the concentration of carbon dioxide included in the sample piece of the thermal insulating foamed material was analyzed. The concentration of NCO groups was determined by infrared spectroscopy. The molar concentrations of epoxy groups, carbon dioxide, and NCO groups held the relationship of:

[Concentration of epoxy group]=2.1{[Concentration of carbon dioxide]+[Concentration of NCO group]}.

For the purpose of comparison, the same assay was carried out for the sample of Example 1:

[Concentration of epoxy group]=1.5{[Concentration of carbon dioxide]+[Concentration of NCO group]}.

The relatively quick decrease in thermal conductivity after the production of the thermal insulating foamed material is attributable to the presence of excess epoxy groups as shown above.

Other samples of thermal insulating foamed material were prepared in the same manner as above, except that the amount of epoxy groups was increased to 3.5 molar equivalents and 5 molar equivalents to the moles of carbon dioxide produced by the reaction of water with the polyisocyanate.

For both the 3.5 molar equivalents and 5 molar equivalents of epoxy groups, the thermal conductivity reached to a substantial plateau in 3 to 5 days after the production. The value of the substantial plateau was 0.0173 W/mk. The increase in epoxy groups to 5 molar equivalents did not significantly improve the thermal conductivity, compared with 3.5 molar equivalents.

The concentrations of epoxy groups, carbon dioxide, and isocyanate groups included in the foamed material were measured for the respective samples of 3.5 molar equivalents and 5 molar equivalents of epoxy groups immediately after the blowing process. In the case of 5 molar equivalents of epoxy groups, the relation was expressed by:

[Concentration of epoxy group]=6{[Concentration of carbon dioxide]+[Concentration of isocyanate group]}.

In the case of 3.5 molar equivalents of epoxy groups, the relation was given as:

[Concentration of epoxy group]=2.9{[Concentration of carbon dioxide]+[Concentration of isocyanate group]}.

In the case of 5 molar equivalents of epoxy groups, it is thought that a large excess of epoxy groups saturated the effect of epoxy groups and did not give a further improvement in thermal conductivity.

[EXAMPLE 4]

A thermal insulating cabinet was prepared in the same manner as in Example 3, except that the 1,1,1,3,3- pentafluoropropane was used as the volatile compound and that the amount of water working as the reactive blowing agent was 1.2 parts.

The thermal conductivity of the thermal insulating foamed material thus obtained decreased to the level of 0.0171 W/mk six days after the production. Since water was used as the reaction blowing agent, the amount of the volatile compound was saved.

[EXAMPLE 5]

A thermal insulating cabinet was prepared in the same manner as in Example 3 using the similar composition to that of Example 3 containing 2.6 molar equivalents of epoxy groups to the moles of carbon dioxide produced by the reaction of water with the polyisocyanate but, as the only difference, including 0.9 parts of dibutyltin laurate as the catalyst for urethane reaction and 9 parts of tetrabutylammonium bromide as the carbon dioxide fixation catalyst.

The thermal conductivity of the thermal insulating foamed material thus obtained decreased to the level of 0.0175 W/mk in six days after the production. The molar concentrations of epoxy groups, carbon dioxide, and NCO groups included in the foamed material held the relationship of:

[Concentration of epoxy group]=2.3{[Concentration of carbon dioxide]+[Concentration of NCO group]}.

The quicker decrease in thermal conductivity is attributable to that the combination of dibutyltin laurate, one of the organotin compounds, and tetrabutylammonium bromide, one of the onium compounds, applied as the catalyst for urethane reaction and the carbon dioxide fixation catalyst decreased the loss of epoxy groups by the side-reaction of epoxy groups and thereby left an excess of epoxy groups.

[EXAMPLE 6]

A thermal insulating cabinet was prepared in the same manner as in Example 1, except that 30 parts of diepoxide obtained by the reaction of bisphenol A with epichlorohydrin were used as the epoxy compound.

The 30 parts of diepoxide correspond to 1.6 molar equivalents of epoxy groups to the moles of carbon dioxide produced by the reaction of 1.0 part of water with the polyisocyanate.

[Reference D]

A thermal insulating cabinet was prepared in the same manner as in Example 6, except that the polyol composition and the isocyanate component were mixed with each other at a ratio of 0.65 molar equivalents of NCO groups to the moles of hydroxyl groups in the polyol composition.

[Reference E]

A thermal insulating cabinet was prepared in the same manner as in Example 6, except that the polyol composition and the isocyanate component were mixed with each other at a ratio of 1.2 molar equivalents of NCO groups to the moles of hydroxyl groups in the polyol composition.

[Reference F]

A thermal insulating cabinet was prepared in the same manner as in Example 6, except that 30 parts of diepoxide and 1 part of the carbon dioxide fixation catalyst were omitted from the polyol composition of Example 6 and that 25 parts of zeolite (zeolite 5A, available from Tosoh Corporation, Japan) working as a carbon dioxide adsorbent were mixed with the isocyanate component.

For each of Example 6 and References D, E, and F, a portion of the thermal insulating foamed material was sampled from the cabinet for evaluation four weeks after the production. The results of measurement are shown in Table 2.

TABLE 2

|  |  | Example | Reference | | |
|---|---|---|---|---|---|
|  |  | 6 | D | E | F |
| Molar equivalents of NCO groups to hydroxyl groups in polyol composition | | 0.9 | 0.65 | 1.2 | 0.9 |
| Content of volatile compound in raw material (wt %) | | 7 | 7 | 7 | 11 |
| Thermal conductivity | (W/mk) | 0.0175 | 0.0175 | 0.0180 | 0.0180 |
| Gas composition (%) | $CO_2$ | 5 | 5 | 30 | 15 |
|  | CP | 95 | 95 | 70 | 85 |
| Density (kg/cm$^3$) | Max. | 38 | 40 | 37 | 48 |
|  | Min. | 35 | 35 | 34 | 35 |
| Compressive strength ($10^5$Pa) | Max. | 1.9 | 1.1 | 1.8 | 1.4 |
|  | Min. | 1.7 | 0.6 | 1.4 | 0.7 |

As clearly shown in Table 2, the thermal insulating foamed material of Example 6 had a small ratio of carbon dioxide in the gas component remaining in the closed cells thereof and thereby possessed excellent thermal insulating properties.

This is ascribed to that diepoxide added as the epoxy compound effectively worked to fix carbon dioxide, formed the crosslinking structure as part of the resin component constituting the cell membranes and the skeleton by the reaction with the polyisocyanate and the epoxy ring-opening reaction, and was resinified through the fixation of carbon dioxide.

Reference D almost completely fixed the carbon dioxide evolved in the blowing process and reduced the thermal conductivity of the resultant thermal insulating foamed material, whereas decreasing the mechanical strength of the thermal insulating foamed material and significantly worsening the appearance and quality of the thermal insulating cabinet. This may be ascribed to the same reason as Reference A.

Reference E did not sufficiently fix the carbon dioxide produced in the blowing process. The carbon dioxide remaining in the closed cells resulted in insufficient reduction of the thermal conductivity of the resultant thermal insulating foamed material. This may be ascribed to the same reason as reference B.

Like Reference C, Reference F suffered from an extremely poor foaming efficiency and the thermal insulating foamed material obtained had an extremely poor compressive strength.

[EXAMPLE 7]

A thermal insulating cabinet was prepared in the same manner as Example 1, except that 20 parts of glycerol diglycidyl ether were used as the epoxy compound.

The 20 parts of glycerol diglycidyl ether correspond to 1.8 molar equivalents of epoxy groups to the moles of carbon dioxide produced by the reaction of 1.0 part of water with the polyisocyanate.

[Reference G]

A thermal insulating cabinet was prepared in the same manner as in Example 7, except that the polyol composition and the isocyanate component were mixed with each other at a ratio of 0.65 molar equivalents of NCO groups to the moles of hydroxyl groups in the polyol composition.

[Reference H]

A thermal insulating cabinet was prepared in the same manner as in Example 7, except that the polyol composition and the isocyanate component were mixed with each other at a ratio of 1.2 molar equivalents of NCO groups to the moles of hydroxyl groups in the polyol composition.

[Reference I]

A thermal insulating cabinet was prepared in the same manner as in Example 7, except that 20 parts of glycerol diglycidyl ether and 1 part of the carbon dioxide fixation catalyst were omitted from the polyol composition of Example 7 and that 25 parts of zeolite (zeolite 5A, available from Tosoh Corporation, Japan) working as a carbon dioxide adsorbent were mixed with the isocyanate component.

For each of Example 7 and References G, H, and I, a portion of the thermal insulating foamed material was sampled from the cabinet for evaluation four weeks after the production. The results of measurement are shown in Table 3.

TABLE 3

|  |  | Example | Reference | | |
|---|---|---|---|---|---|
|  |  | 7 | G | H | I |
| Molar equivalents of NCO groups to hydroxyl groups in polyol composition | | 0.9 | 0.65 | 1.2 | 0.9 |
| Content of volatile compound in raw material (wt %) | | 7 | 7 | 7 | 11 |
| Thermal conductivity | (W/mk) | 0.0175 | 0.0175 | 0.0180 | 0.0180 |
| Gas composition (%) | $CO_2$ | 5 | 5 | 30 | 15 |
|  | CP | 95 | 95 | 70 | 85 |
| Density (kg/cm³) | Max. | 37 | 40 | 36 | 48 |
|  | Min. | 35 | 35 | 34 | 35 |
| Compressive strength ($10^5$Pa) | Max. | 1.8 | 1.2 | 1.8 | 1.4 |
|  | Min. | 1.6 | 0.7 | 1.5 | 0.7 |

As clearly shown in Table 3, the thermal insulating foamed material of Example 7 had a small ratio of carbon dioxide in the gas component remaining in the closed cells thereof and thereby possessed excellent thermal insulating properties.

This is ascribed to that glycerol diglycidyl ether added as the epoxy compound effectively worked to fix carbon dioxide and was resinified through the fixation of carbon dioxide.

Reference G almost completely fixed the carbon dioxide evolved in the blowing process and reduced the thermal conductivity of the resultant thermal insulating foamed material, whereas decreasing the mechanical strength of the thermal insulating foamed material and significantly worsening the appearance and quality of the thermal insulating box. This may be ascribed to the same reason as Reference A.

Reference H did not sufficiently fix the carbon dioxide produced in the blowing process. The carbon dioxide remaining in the closed cells resulted in insufficient reduction of the thermal conductivity of the resultant thermal insulating foamed material. This may be ascribed to the same reason as reference B.

Like Reference C, Reference I suffered from an extremely poor foaming efficiency and the thermal insulating foamed material obtained had an extremely poor compressive strength.

[EXAMPLE 8]

A polyol composition was prepared by mixing a mixture of 100 parts of an aromatic amine polyether polyol having a hydroxyl group value of 460 mgKOH/g, 2.0 parts of a catalyst for urethane reaction (KAOLIZER No. 1, available from Kao Corporation, Japan), 1.5 parts of a foam stabilizer (a silicone surfactant F-335, available from Shin-Etsu Chemical Co., Ltd., Japan), 1.0 part of water functioning as a reactive blowing agent, and specific parts of cyclopentane functioning as a volatile compound adjusted to give a free blow density of 25 to 27 kg/m³ to a resultant thermal insulating foamed material, with a mixture of 25 parts of phenyl glycidyl ether as an epoxy compound and 2 parts of tetrabutylammonium bromide/zinc chloride (1/1) as a carbon dioxide fixation catalyst. An isocyanate component was a polyisocyanate composed of crude MDI having an amine equivalent of 135.

The 25 parts of phenyl glycidyl ether correspond to 4.0 molar equivalents of epoxy groups to the moles of carbon dioxide produced by the reaction of 1.0 part of water working as the reactive blowing agent with the polyisocyanate.

The polyol composition and the isocyanate component thus prepared were mixed with each other with a high pressure foaming machine at a ratio of 1.15 molar equivalents of NCO groups to the moles of hydroxyl groups in the polyol composition. The polyethylene raw material thus prepared was injected into a space configured between an inner housing and an outer housing and allowed to blow itself to obtain a polyurethane foam. This gave a thermal insulating cabinet filled with the polyurethane foam.

[Reference J]

A thermal insulating cabinet filled with a thermal insulating foamed material was prepared from the similar composition to that of Example 8 except including 7.5 parts of phenyl glycidyl ether, that is, 0.9 molar equivalents of epoxy groups to the moles of carbon dioxide produced by the reaction of water working as the reactive blowing agent with the polyisocyanate.

[Reference K]

A thermal insulating cabinet was prepared in the same manner as in Example 8, except that 25 parts of phenyl glycidyl ether and 2 parts of the carbon dioxide fixation catalyst were omitted from the polyol composition of Example 8 and that 25 parts of zeolite (zeolite 5A, available from Tosoh Corporation, Japan) working as a carbon dioxide adsorbent were mixed with the isocyanate component.

For each of Example 8 and References J and K, a portion of the thermal insulating foamed material was sampled from the cabinet for evaluation three weeks after the production. The results of measurement are shown in Table 4.

TABLE 4

|  | Example | Reference | |
|---|---|---|---|
|  | 8 | J | K |
| Molar equivalents of epoxy groups to moles of carbon dioxide evolved from reactive blowing agent | 4.0 | 0.9 | Zeolite |
| Content of volatile compound in raw material (wt %) | 7 | 7 | 11 |
| Thermal conductivity (W/mk) | 0.0175 | 0.0185 | 0.0180 |

TABLE 4-continued

|  |  | Example | Reference | |
|---|---|---|---|---|
|  |  | 8 | J | K |
| Gas composition (%) | $CO_2$ | 5 | 30 | 15 |
|  | CP | 95 | 70 | 85 |
| Density (kg/cm$^3$) | Max. | 37 | 36 | 48 |
|  | Min. | 35 | 34 | 35 |
| Compressive strength ($10^5$Pa) | Max. | 1.8 | 1.7 | 1.4 |
|  | Min. | 1.4 | 1.4 | 0.7 |

As clearly shown in Table 4, the thermal insulating foamed material of Example 8 had a small ratio of carbon dioxide remaining in the closed cells thereof and thereby possessed excellent thermal insulating properties.

The phenyl glycidyl ether used in Example 8 contained 4.0 molar equivalents of excess epoxy groups to the moles of carbon dioxide produced by the reaction of water with the polyisocyanate. The excess of epoxy groups was sufficient for effectively fixing the carbon dioxide remaining in the closed cells.

The thermal insulating foamed material of Example 8 was analyzed immediately after the blowing process according to the method described in Example 3. The result of measurement gave the following relationship, which suggested the presence of a sufficient amount of epoxy groups:

[Concentration of epoxy group]=2.1{[Concentration of carbon dioxide]+[Concentration of isocyanate group]}.

At that time, the partial pressure of carbon dioxide was already lower than the partial pressure of cyclopentane, which proved the conclusion of production. The similar analysis was carried out one month after the production. The measurement confirmed the presence of remaining epoxy groups and showed that the following relationship was satisfied:

[Concentration of epoxy group]>{[Concentration of carbon dioxide]+[Concentration of isocyanate group]}.

Analysis of the gas included in the thermal insulating foamed material showed that the partial pressure of cyclopentane was 360 mmHg whereas that of carbon dioxide was 140 mmHg. The greater partial pressure of cyclopentane showed the conclusion of production.

Like Example 1, phenyl glycidyl ether was resinified to contribute to the improvement in strength.

Reference J did not sufficiently fix the carbon dioxide produced in the blowing process. The carbon dioxide remaining in the closed cells resulted in insufficient reduction of the thermal conductivity of the resultant thermal insulating foamed material. This may be ascribed to the insufficient amount of remaining epoxy groups.

Reference K reduced the amount of carbon dioxide remaining in the closed cells to some extent while suffering from an extremely poor foaming efficiency. The thermal insulating foamed material prepared in Reference K had a high density with large scatter. This worsened the packing properties. The thermal insulating foamed material also had an extremely poor compressive strength.

The extracts from the sample piece of the thermal insulating foamed material into methanol were analyzed by liquid chromatography. The measurement showed 0.025 mole of 4-(phenoxymethyl)-1,3-dioxolan-2-on, a cyclic carbonate produced by addition reaction of carbon dioxide to phenyl glycidyl ether, per 100 g of the thermal insulating foamed material. Only one gram of water was used as the reactive blowing agent to 100 g of polyol. This resulted in a small amount of carbon dioxide evolved through the reaction of water with the polyisocyanate and there a small amount of the carbonate produced.

[EXAMPLE 9]

A thermal insulating cabinet was prepared in the same manner as in Example 8, except that 50 parts of diepoxide obtained by the reaction of bisphenol A with epichlorohydrin were used as the epoxy compound.

The 50 parts of diepoxide correspond to 2.6 molar equivalents of epoxy groups to the moles of carbon dioxide produced by the reaction of 1.0 part of water with the polyisocyanate.

[Reference L]

A thermal insulating cabinet filled with a thermal insulating foamed material was prepared from the similar composition to that of Example 9 except including 17 parts of diepoxide, that is, 0.9 molar equivalents of epoxy groups to the moles of carbon dioxide produced by the reaction of water with the polyisocyanate.

[Reference M]

A thermal insulating cabinet was prepared in the same manner as in Example 9, except that 50 parts of diepoxide and 2 parts of the carbon dioxide fixation catalyst were omitted from the polyol composition of Example 9 and that 25 parts of zeolite (zeolite 5A, available from Tosoh Corporation, Japan) working as a carbon dioxide adsorbent were mixed with the isocyanate component.

For each of Example 9 and References L and M, a portion of the thermal insulating foamed material was sampled from the cabinet for evaluation three weeks after the production. The results of measurement are shown in Table 5.

TABLE 5

|  |  | Example | Reference | |
|---|---|---|---|---|
|  |  | 9 | L | M |
| Molar equivalents of epoxy groups to moles of carbon dioxide evolved from reactive blowing agent |  | 2.6 | 0.9 | Zeolite |
| Content of volatile compound in raw material (wt %) |  | 7 | 7 | 11 |
| Thermal conductivity | (W/mk) | 0.0175 | 0.0187 | 0.0180 |
| Gas composition (%) | $CO_2$ | 5 | 35 | 15 |
|  | CP | 95 | 65 | 85 |
| Density (kg/cm$^3$) | Max. | 38 | 36 | 48 |
|  | Min. | 34 | 33 | 35 |
| Compressive strength ($10^5$Pa) | Max. | 2.0 | 1.8 | 1.4 |
|  | Min. | 1.8 | 1.4 | 0.7 |

As clearly shown in Table 5, the thermal insulating foamed material of Example 9 had an extremely small ratio of carbon dioxide remaining in the closed cells thereof and possessed excellent thermal insulating properties as well as sufficient compressive strength.

Reference L did not sufficiently fix the carbon dioxide produced in the blowing process. The carbon dioxide remaining in the closed cells resulted in insufficient reduction of the thermal conductivity of the resultant thermal insulating foamed material. This may be ascribed to the same reason as reference J.

Like Reference K, Reference M suffered from an extremely poor foaming efficiency and the thermal insulating foamed material obtained had an extremely poor compressive strength.

[EXAMPLE 10]

A thermal insulating cabinet was prepared in the same manner as in Example 8, except that 30 parts of glycerol diglycidyl ether were used as the epoxy compound.

The 30 parts of glycerol diglycidyl ether correspond to 2.6 molar equivalents of epoxy groups to the moles of carbon dioxide produced by the reaction of 1.0 part of water with the polyisocyanate.

[Reference N]

A thermal insulating cabinet filled with a thermal insulating foamed material was prepared from the similar composition to that of Example 10 except including 10 parts of glycerol diglycidyl ether, that is, 0.9 molar equivalents of epoxy groups to the moles of carbon dioxide produced by the reaction of water with the polyisocyanate.

[Reference O]

A thermal insulating cabinet was prepared in the same manner as in Example 10, except that 30 parts of glycerol diglycidyl ether and 2 parts of the carbon dioxide fixation catalyst were omitted from the polyol composition of Example 10 and that 25 parts of zeolite (zeolite 5A, available from Tosoh Corporation, Japan) working as a carbon dioxide adsorbent were mixed with the isocyanate component.

For each of Example 10 and References N and O, a portion the thermal insulating foamed material was sampled from the cabinet for evaluation three weeks after the production. The results of measurement are shown in Table 6.

TABLE 6

|  |  | Example | Reference | |
|---|---|---|---|---|
|  |  | 10 | N | O |
| Molar equivalents of epoxy groups to moles of carbon dioxide evolved from reactive blowing agent |  | 2.6 | 0.9 | Zeolite |
| Content of volatile compound in raw material (wt %) |  | 7 | 7 | 11 |
| Thermal conductivity | (W/mk) | 0.0175 | 0.0185 | 0.0180 |
| Gas composition (%) | $CO_2$ | 5 | 30 | 15 |
|  | CP | 95 | 70 | 85 |
| Density (kg/cm$^3$) | Max. | 37 | 37 | 48 |
|  | Min. | 34 | 34 | 35 |
| Compressive strength ($10^5$Pa) | Max. | 1.8 | 1.7 | 1.4 |
|  | Min. | 1.6 | 1.4 | 0.7 |

The thermal insulating foamed material of Example 10 had excellent thermal insulating properties and sufficient compressive strength like Example 8.

Reference N did not sufficiently fix the carbon dioxide produced in the blowing process. The carbon dioxide remaining in the closed cells resulted in insufficient reduction of the thermal conductivity of the resultant thermal insulating foamed material. This may be ascribed to the same reason as reference L.

Like Reference K, Reference O suffered from an extremely poor foaming efficiency and the thermal insulating foamed material obtained had an extremely poor compressive strength.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A thermal insulating foamed polyurethane resin composition comprising a multiplicity of closed cells in which a vapor of at least one volatile compound having a boiling point of not higher than 150° C. and a molecular weight of not less than 70 and carbon dioxide occupy said closed cells, and wherein a partial pressure of said volatile compound occupying said closed cells is at least 5 mmHg at 25° C. and a partial pressure of carbon dioxide occupying said closed cells is lower than that of said volatile compound, and wherein inner wall surfaces of said closed cells comprise a solid or liquid cyclic carbonate compound as an addition reaction product of carbon dioxide to epoxy groups in the presence of a carbon dioxide fixation catalyst.

2. The thermal insulating foamed polyurethane resin composition in accordance with claim 1, wherein said volatile compound has a boiling point of not lower than 40° C. and not higher than 100° C., and the partial pressure of said volatile compound occupying said closed cells is not lower than 50 mmHg and not higher than 450 mmHg.

3. The thermal insulating foamed polyurethane resin composition in accordance with claim 2, wherein the partial pressure of said volatile compound occupying said closed cells is at least ten times the partial pressure of said carbon dioxide.

4. The thermal insulating foamed polyurethane resin composition in accordance with claim 1, wherein said volatile compound comprises cyclopentane.

5. The thermal insulating foamed polyurethane resin composition in accordance with claim 1, wherein said volatile compound comprises 1,1,1,3,3-pentafluoropropane.

6. The thermal insulating foamed polyurethane resin composition in accordance with claim 1, wherein said cyclic carbonate is less than 0.040 mole to 100 g of said polyurethane resin composition.

7. The thermal insulating foamed polyurethane resin composition in accordance with claim 1, wherein said polyurethane resin composition comprises an epoxy compound which is a liquid at temperatures of not lower than 10° C. and not higher than 30° C., and wherein carbon dioxide occupying said closed cells reacts with epoxy groups in said epoxy compound in the presence of said carbon dioxide fixation catalyst to form a solid or liquid cyclic carbonate compound, thus decreases said epoxy groups and increases said cyclic carbonate compound.

8. The thermal insulating foamed polyurethane resin composition in accordance with claim 7, wherein molar concentrations of the epoxy groups of said epoxy compound, carbon dioxide, and isocyanate groups of a polyisocyanate included in said polyurethane resin composition after the blowing process satisfy a relationship of:

[Concentration of epoxy group]>{[Concentration of carbon dioxide]+[Concentration of isocyanate group]}.

9. The thermal insulating foamed polyurethane resin composition in accordance with claim 7, wherein molar concentrations of the epoxy groups of said epoxy compound, carbon dioxide, and isocyanate groups of a polyisocyanate included in said polyurethane resin composition immediately after the blowing process satisfy a relationship of:

3{[Concentration of carbon dioxide]+[Concentration of isocyanate group]}>[Concentration of epoxy group]

>2{C[Concentration of carbon dioxide]+ [Concentration of isocyanate group]}.

10. A method of manufacturing a thermal insulating foamed material comprising the steps of:

concurrently mixing and blowing a polyurethane raw material to produce a foamed polyurethane resin composition with a multiplicity of closed cells, said polyurethane material comprising a polyisocyanate, a polyol, a foam stabilizer, a catalyst for urethane reaction, a reactive blowing agent, a volatile compound having a boiling point of not higher than 150° C. and a molecular weight of not less than 70, an epoxy compound, and a carbon dioxide fixation catalyst, wherein said closed cells are filled with said volatile compound and carbon dioxide produced by reaction of said reactive blowing agent with said polyisocyanate; and allowing said carbon dioxide to chemically react with epoxy groups of said epoxy compound in the presence of said carbon dioxide fixation catalyst to form a solid or liquid cyclic carbonate compound, thereby to obtain a foamed material, wherein inside spaces of said closed cells are substantially filled with a vapor of said volatile compound at a partial pressure of at least 5 mmHg at 25° C.

11. The method in accordance with claim 10, wherein said epoxy compound is a liquid at temperatures of not lower than 10° C. and not higher than 30° C.

12. The method in accordance with claim 10, wherein said volatile compound has a boiling point of not lower than 40° C. and not higher than 100° C., and the partial pressure of said volatile compound occupying said closed cells is not lower than 50 mmHg and not higher than 450 mmHg at 25° C.

13. The method in accordance with claim 10, wherein said polyisocyanate has 0.7 to 1.1 molar equivalents of NCO groups to moles of hydroxyl groups in said polyurethane raw material.

14. The method in accordance with claim 10, wherein said epoxy compound has one or greater molar equivalents of epoxy groups to moles of carbon dioxide produced by the reaction of said reactive blowing agent with said polyisocyanate.

15. The method in accordance with claim 10, wherein said reactive blowing agent comprises water and a content thereof is not less than 0.5 parts by weight but less than 1.5 parts by weight per 100 parts by weight of said polyol.

16. The method in accordance with claim 15, wherein said epoxy compound has 2.5 to 4 molar equivalents of epoxy groups to moles of carbon dioxide produced by the reaction of said reactive blowing agent with said polyisocyanate.

17. The method in accordance with claim 10, wherein said epoxy compound has two to four epoxy groups in one molecule thereof.

18. The method in accordance with claim 10, wherein said epoxy compound has one to three hydroxyl groups in one molecule thereof.

19. The method in accordance with claim 10, wherein a combination of organotin compound with an onium compound functions as said catalyst for urethane reaction and said carbon dioxide fixation catalyst.

20. The method in accordance with claim 10, wherein said mixing and blowing step is carried out in a container of which atmosphere is replaced with at least one gas selected from the group consisting of xenon, krypton, and carbon dioxide, and wherein said polyurethane raw material is injected into said container under a pressure of said gas.

21. The method in accordance with claim 10, wherein said reactive blowing agent comprises water.

22. The method in accordance with claim 10, wherein said reactive blowing agent comprises a lower carboxylic acid.

23. A method of manufacturing a thermal insulating foamed material comprising the steps of:

preparing a polyurethane raw material by mixing polyisocyanate with a polyol composition comprising water as a reactive blowing agent, a volatile compound having a boiling point of not higher than 150° C. and a molecular weight of not less than 70, an epoxy compound and a carbon dioxide fixation catalyst and a polyol, injecting said polyurethane raw material into a container to form a polyurethane foamed material having a multiplicity of closed cells filled with said volatile compound and carbon dioxide produced by reaction of said water with said polycyanate, and allowing said carbon dioxide in said closed cells to react with said epoxy compound in the presence of said carbon dioxide fixation catalyst to form a solid or liquid cyclic carbonate compound, thereby to obtain a foamed material whose closed cells are substantially occupied by a vapor of said volatile compound at a partial pressure of at least 5 mmHg at 25° C.

24. The method in accordance with claim 23, wherein said epoxy compound is a liquid at temperatures of not lower than 10° C. and not higher than 30° C.

25. The method in accordance with claim 23, wherein said volatile compound has a boiling point of not lower than 40° C. and not higher than 100° C., and the partial pressure of said volatile compound occupying said closed cells is not lower than 50 mmHg and not higher than 450 mmHg at 25° C.

26. The method in accordance with claim 23, wherein said polyisocyanate has 0.7 to 1.1 molar equivalents of NCO groups to moles of hydroxyl groups in said polyurethane raw material.

27. The method in accordance with claim 23, wherein a content of said water is not less than 0.5 parts by weight but less than 1.5 parts by weight per 100 parts by weight of said polyol.

28. The method in accordance with claim 27, wherein said epoxy compound has 2.5 to 4 molar equivalents of epoxy groups to moles of carbon dioxide produced by the reaction of said reactive blowing agent with said polyisocyanate.

29. The method in accordance with claim 23, wherein said epoxy compound has two to four epoxy groups in one molecule thereof.

30. The method in accordance with claim 23, wherein said epoxy compound has one to three hydroxyl groups in one molecule thereof.

* * * * *